US011733971B2

(12) United States Patent
Hill et al.

(10) Patent No.: US 11,733,971 B2
(45) Date of Patent: Aug. 22, 2023

(54) SYSTEM AND METHOD OF MANAGING PSEUDO-RANDOM NUMBER GENERATION IN A MULTIPROCESSOR ENVIRONMENT

(71) Applicant: Simudyne Ltd., London (GB)

(72) Inventors: John Hill, London (GB); Chris Spencer, London (GB)

(73) Assignee: Simudyne, Ltd., London (GB)

( * ) Notice: Subject to any disclaimer, the term of this patent is extended or adjusted under 35 U.S.C. 154(b) by 770 days.

(21) Appl. No.: 16/421,996

(22) Filed: May 24, 2019

(65) Prior Publication Data

US 2020/0278838 A1 Sep. 3, 2020

Related U.S. Application Data

(60) Provisional application No. 62/812,739, filed on Mar. 1, 2019.

(51) Int. Cl.
*H04L 29/06* (2006.01)
*G06F 7/58* (2006.01)
*H04L 9/06* (2006.01)
*G06F 30/33* (2020.01)

(52) U.S. Cl.
CPC .............. *G06F 7/582* (2013.01); *G06F 30/33* (2020.01); *H04L 9/0643* (2013.01)

(58) Field of Classification Search
CPC ......... G06F 7/582; G06F 30/33; H04L 9/0643
USPC ....................................................... 713/189
See application file for complete search history.

(56) References Cited

U.S. PATENT DOCUMENTS

| 9,391,858 | B2* | 7/2016 | Narasimhan | ........ H04L 41/0893 |
|---|---|---|---|---|
| 10,133,575 | B2 | 11/2018 | Greiner et al. | |
| 2010/0274663 | A1 | 10/2010 | Hinton et al. | |
| 2010/0306296 | A1* | 12/2010 | Inglett | ..................... G06F 7/588 |
| | | | | 708/255 |
| 2012/0179735 | A1* | 7/2012 | Ferguson | .................. G06F 7/58 |
| | | | | 708/254 |
| 2013/0297477 | A1 | 11/2013 | Overman et al. | |
| 2014/0223148 | A1 | 8/2014 | Inglett et al. | |
| 2015/0095368 | A1 | 4/2015 | Koppes et al. | |
| 2020/0012734 | A1 | 1/2020 | Lee et al. | |
| 2020/0014529 | A1* | 1/2020 | Kanza | ................... H04W 12/64 |
| 2021/0326442 | A1* | 10/2021 | Campagna | .............. G06F 21/64 |

OTHER PUBLICATIONS

Donghui Lin et al: "Massively Multi-Agent Systems II", Massively Multi-Agent Systems II : International Workshop, MMAS 2018, Stockholm, Sweden, Jul. 14, 2018, Revised Selected Papers, Jul. 14, 2018 (Jul. 14, 2018), XP055686607, Cham ISBN: 978-3-030-20937-7 Retrieved from the Internet: URL:http://link.springer.com/content/pdf/10.1007/978-3-030-20937-7.pdf [retrieved on Apr. 16, 2020] pp. 103-114.
IBM "IBM System Blue Gene/Q", Nov. 30, 2011 pp. 1-6 ZPO55689358. http://www.fz-juelich.de/sharedocs/downloads/ias/jsc/en/juqueen/bgqibmdatasheet.pdf?_blob=publicationfile . Retried Apr. 27, 2020.

(Continued)

*Primary Examiner* — Evans Desrosiers
(74) *Attorney, Agent, or Firm* — Ted Sabety; Sabety +associates, PLLC

(57) ABSTRACT

This relates to hierarchical pseudo-random number generation for use in computer simulations that operate across more than one computing machine.

42 Claims, 4 Drawing Sheets

(56) References Cited

OTHER PUBLICATIONS

Marquez Claudio et al: "Graph-Based Automatic Dynamic Load Balancing for HPC Agent-Based Simulations", Dec. 18, 2015 (Dec. 18, 2015), International Conference on Financial Cryptography and Data Security; [Lecture Notes in Computer Science; Lect.Notes Computer], Springer, Berlin, Heidelberg, pp. 405-416, XP047344710, ISBN: 978-3-642-17318-9 [retrieved on Dec. 18, 2015] abstract pp. 3-7.

* cited by examiner

SYSTEM AND METHOD OF MANAGING PSEUDO-RANDOM NUMBER GENERATION IN A MULTIPROCESSOR ENVIRONMENT

PRIORITY CLAIM

This is a utility application, which claims the benefit of U.S. Provisional Patent Application No. 62/812,739 filed on Mar. 1, 2019 which is hereby incorporated by reference in its entirety for all that it teaches.

FIELD OF INVENTION

This relates to hierarchical pseudo-random number generation for use in computer simulations that operate across more than one computing machine.

BACKGROUND

Computer modelling has developed over the years to permit simulations of physical processes. For example, simulations of nuclear device explosions have been used to determine the qualities of a weapon without actually setting one off. These kinds of simulations operate by setting up data structures that represent defined regions in space and then calculating physical processes within each region for a sequence of time slices using physics equations and propagating physical effects between the regions as input into the processing of the regions in the next time slice. As these simulations become more granular, that is, the regions become smaller and the time slices shorter, the computer workload increases significantly. To address this, techniques have been devised to utilize more than one computer to execute the simulation. In this approach, there arises the inevitable process of how to assign portions of the workload to different computers in order that the overall simulation execute quickly using the machines together. Alternatively, a model for computer simulation may be organized as a plurality of agents that interoperate. In this case, the processes represent the agents. In this scenario too, one has to allocate the agents across computing machines in order to improve performance. How the computers are allocated the simulation regions or simulation agents therefore can affect how much communication processing has to be conducted between the computers—often an aspect of the entire simulation process that impedes its execution speed. One aspect of this problem relates to the use of pseudo-random number generation. The object of the invention is to avoid broadcasting pseudo-random numbers from a single source to all machines (due to bandwidth constraints), but instead allow local generation of pseudo-random numbers. The then arises the problem of how to do this in order to permit deterministic recreation of the simulation for verification purposes.

SUMMARY

This relates to pseudo-random number generation processes. Pseudo-random number generation processes are used in computer simulations to simulate random input into the simulation model. However, in a complex simulation operating across many computer processing machines or across many agents in the simulation, it may be impossible to recreate the pseudo-random events in order to recreate the simulation in order to verify them. In a multi-processor system executing a simulation, each pseudo-random number generation process on each of the machines is preferably deterministically seeded. This permits a deterministic recreation of a simulation because pseudo-random number generators are, in fact, deterministic algorithms whose output can be repeated given the same seed as input. (Pseudo random number generator is abbreviated as "PRNG".) A pseudorandom number generator (PRNG), also known as a deterministic random bit generator (DRBG), is an algorithm for generating a sequence of numbers whose properties approximate the properties of sequences of random numbers. The PRNG-generated sequence is not truly random, because it is completely determined by an initial value, called the PRNG's seed (which itself may include truly random values). PRNGs are central in applications such as simulations (e.g. for the Monte Carlo method). Good statistical properties are a central requirement for the output of a PRNG. Pseudorandom number generators are important in practice for their speed in number generation and their reproducibility. Reproducibility can be accomplished in a multi-agent or multi-processor simulation environment by a hierarchical seed generation process that is only dependent on one root seed at the top of the hierarchy.

DESCRIPTION OF THE FIGURES

The headings provided herein are for convenience only and do not necessarily affect the scope or meaning of the claimed invention. In the drawings, the same reference numbers and any acronyms identify elements or acts with the same or similar structure or functionality for ease of understanding and convenience. To easily identify the discussion of any particular element or act, the most significant digit or digits in a reference number refer to the Figure number in which that element is first introduced (e.g., element 204 is first introduced and discussed with respect to FIG. 2).

DETAILED DESCRIPTION

Figure 1:
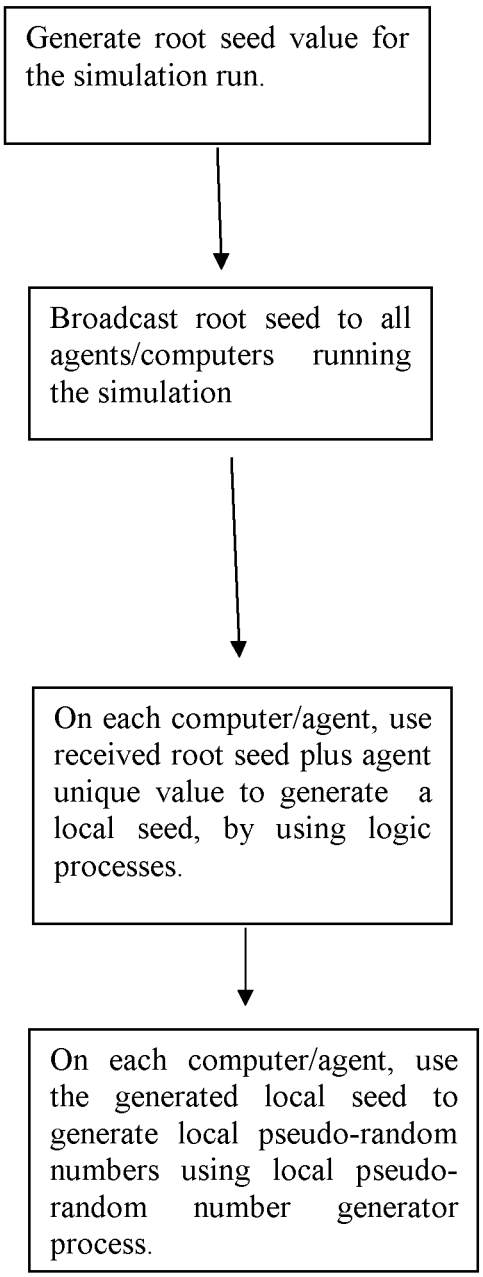
FIG. 1: Basic Flow Chart.
Figure 2:
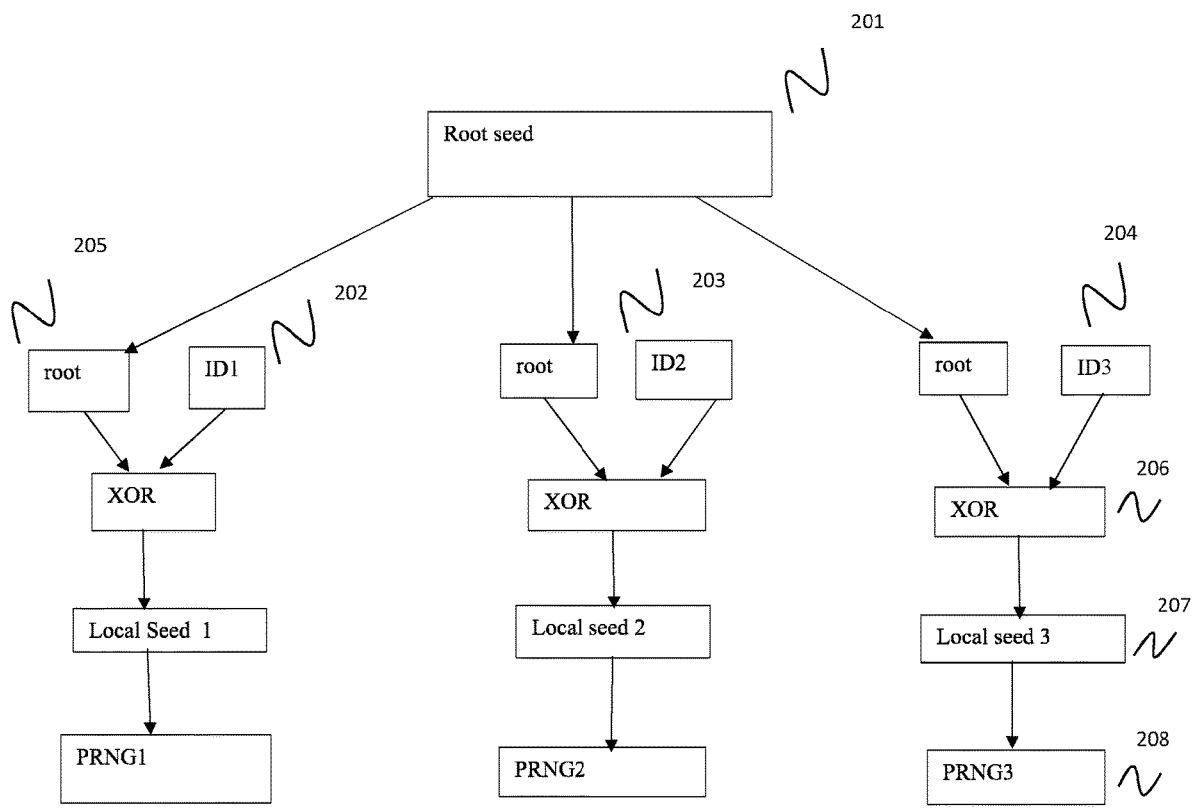
FIG. 2: A diagram depicting two level distribution of a root seed to local machines.
Figure 3:
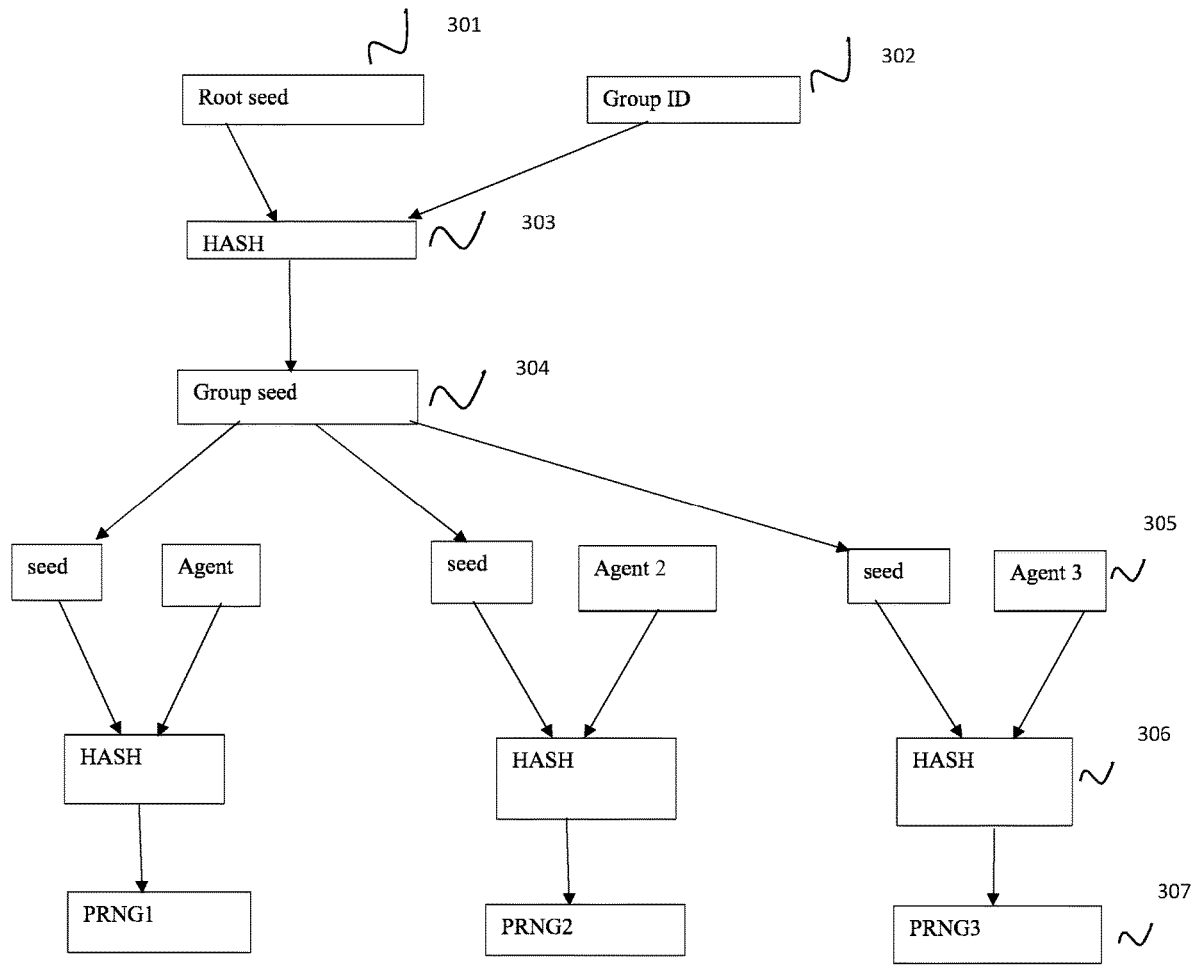
FIG. 3: A diagram depicting multi level distribution using a group identifier.

Various examples of the invention will now be described. The following description provides specific details for a thorough understanding and enabling description of these examples. One skilled in the relevant art will understand, however, that the invention may be practiced without many of these details. Likewise, one skilled in the relevant art will also understand that the invention can include many other features not described in detail herein. Additionally, some well-known structures or functions may not be shown or described in detail below, so as to avoid unnecessarily obscuring the relevant description. The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section.

The invention is related to independently seeding pseudo-random number generating processes for agents in an agent simulation in a deterministic manner in order to facilitate replication of a particular simulation run for verification purposes. In one embodiment, to ensure that simulation results are repeatable, these agents need to be seeded independently of allocation and communication across machines and the pseudo-random numbers generated from the seeds in a deterministic fashion. To ensure the simulation results can still be repeated, there needs to be a root seed common to all of the machines or agents, which controls the allocation of seeds across these agents. Changing this root seed needs to uniformly (and repeatably, by being deterministic) change every other seed in the system. In one embodiment, a 2-level hierarchy may be organized, where an XOR (exclusive OR logic function) of the root seed value with each agent ID value (or some other agent unique value that can be deterministically created) would produce a unique seed for each agent, and that seed used as input into the pseudo-random number generator for that agent. Recreating the simulation can be accomplished because the root seed value is common to all of the machines or agents and the agent ID value or other agent unique value is deterministically recreated. Therefore, the recreation of the pseudo-random numbers may be accomplished on each machine or agent independently. In this embodiment, a root seed (201) is broadcast to all of the agent processes, (205). Each agent with an identifier (202), (203), (204) receives the root and then operates a mixing function (206) to create the local seed (207). The local seeds, or states, are then fed into the individual PRNG (208) to generate a random sequence of numbers for the local processes.

Second to this, additional hierarchy may be introduced into agent based models (e.g. Agents belong to groups). The use of monotonic numbering to create identifiers is an example of an approach that has some drawbacks when it comes to adaptability to larger systems, or provision of independence guarantees. Hierarchical derivation gives a preferable property that when a completely independent group of agents is added to a multi-agent simulation model, and the same root seed is used, then the results (for original groups of agents) will remain the same. In this embodiment each agent-node in the hierarchy is independent of others, and their corresponding agent-IDs within a group need to be within the group and not global. Identifiers based on a group identifier must remain stable with addition to removal of other groups, for example by employing explicit numbering/naming. In this embodiment, the root seed (301) is broadcast to the parent node of a group of agents (303), as input to its mixing function at that level (303). The other input is the Group ID for that level (302). The output of the mixing function, depicted as a hash (303) is then used as a seed, referred to as a state value (304) for that group, at the level in the hierarchy that group represents. This value is shared at the next level down: which may be another group or subgroup, representing a subsets of the level above it, but is depicted as a group of agents (305). The state value for a group is then combined in a mixing function (306) with the agent identifiers in that group (305). The results of that are then used as input into individual PRNG functions (307) to produce random number sequences for the simulation. Alternatively, the root (401) is mixed (403) with a level 1 identifier (402) to create an input to the next level mixing (405), using the next level identifier (404), which may be repeated transitively (406) until the agent identifier (407) is mixed with that level seed (408) to create a state that is used to drive the PRNG (409).

In this case, with a fixed root seed the introduction of an independent group will not affect the pseudo random number generation of the existing groups in the simulation. Further, this embodiment preferably prevents changes at the same level in the hierarchy in one group to affect another group. In other words, groups may be partitioned (from a pseudo-random number generation perspective) from one another. This approach to establish stable, independent seeds for each agent avoids statistical collisions. Rather, the seeds are only synchronized at the start of the simulation, starting with the root seed at the top of the hierarchy. The agent identifiers used as input to the mixing function to create the local state value should be one that is unlikely to generate collisions. In any case, the output of the mixing function, used as the input to the PRNG, is not a random "seed", strictly speaking, but referred to as a "state", which may be deterministically recreated if the same random root seed is used to recreate the hierarchical distribution.

In an alternative embodiment, one way to solve this is to use a cryptographic hash is fed an identifier for each level of the hierarchy (e.g. group & agent ID) which generates a state whose byte length is longer than or equal to the required state for pseudo random number generation implementation. Alternatively the root seed is XOR'd with some identifier for the group to create a group seed and each agent uses the group seed to create its own agent seed using its Agent ID. The Boolean logic would calculate Agent State value= (AgentID XOR (GroupID XOR Rootseed)), where AgentID would be framed as its position within the group, rather than a global ID. In this approach, two agents with the same AgentIDs in two different groups end up with two different Agent Seeds (absent a collision, discussed below). The addition of a fully independent group of agents will result in different agent seeds so long as the GroupIDs are similarly stable. The improvement from only considering root seed+ agent ID, to considering a hierarchical approach, is that for a node in the tree of seed derivation, any change for a particular node should only affect the seed derivation for nodes in the subtree. In contrast, if agents identifiers are numbered monotonically (which must be the case in order to avoid sharing agent identifiers), and there are two conceptual groups A, B, any agents added to group A will affect the seeds in group B because their IDs will be shifted.

The identifier for each level in the hierarchy may be user-defined such that the independence can be user-controlled. For example, an agent name, if unique, could be used as the hash input for agents within a group. The addition of new agents to that group therefore will not affect the existing agents in that group's seeds. Preferably, each level identifier of the hierarchy should have the same length to avoid collisions caused by concatenation with lower levels of each sub-tree. In this formulation, agents (305) are leaves on a hierarchical tree, with organising structures, (303, 304) as the intermediate nodes. In one embodiment a data structure may be formed in computer memory that represents the hierarchy of nodes, which each element in the data structure contains the identifiers, state values, and pointers to neighboring nodes in the hierarchy. However it would be possible to construct systems where agents themselves could act as the organising structure for hierarchical distribution of deterministic seeds, especially in dynamic systems (where agents may spawn other agents). In this case, the data structure that represents an instance of an agent can have data entries representing the identifier, the state value, and pointers to its neighboring nodes in the hierarchy, or to the node representing the group it is a member of. Then the stability guarantees can be done transitively through that process (as an agent spawned by another agent is stable with regards to their identity/state). Stability needs to be assessed on a case by case basis, whether that is using some required uniquebut-stable input from an end user of the system (such as a group name) or whether another stable value can be ascertained automatically.

In one embodiment, the process uses a cryptographic hash as the mixing function. In other embodiments, other kinds of logical function maybe used, for example the exclusive OR (XOR) of the values. Although each Agent ID is by definition unique, the function that uses that and the root seed may produce the same seed output for two different Agent IDs. This is called a collision and is not ideal for the simulation. In the preferred embodiment a function that has a low likelihood of collisions, that is, a low likelihood that two agents end up with the same PRNG seed used in the simulation. The discussion using XOR as the combining or mixing function is exemplary and other numerical functions may be used, for example, hash functions or other functions that will produce a random-like distribution of numeric output across the range of seed inputs. The function just needs the property of taking n>1 pieces of data and producing a state number for the PRNG where desired state size is dependent upon the implementation of the PRNG.

Note that XOR on its own could not be used as a cryptographic combining function for the seed and agent ID because it will introduce collisions—where two different nodes with two different agent identifiers ends up with the same local seed using the same root. A hash or similar mixing function may be used combining seeds or states and agent identifiers, but is quite a bit of safety to be gained by avoiding collisions, as these seeds are used for a full simulation. Therefore, in the preferred embodiment a crypto hash is used to mitigate the collision problem. An idealized mixing function has the property that any change in any of the input leads to approximately half of the bits in the output flipping.

The probability of a collision would be related to the number of agents, but due to the birthday paradox, that probability needs to be significantly lower than 1/N (N being the number of agents). That is, the goal is that the chance of any two seeds being the same to be some low number based on the number of simulation runs, the number of agents as empirically considered by testing for undue correlation between simulation runs. Probability is going to be $(1-C)**(N-1)$ where C is the chance of an agent colliding with an existing seed. In the preferred embodiment, the probability should be below statistical significance or likelihood, arbitrarily below 0.01%, and then adjusted again for the number of runs.

In one embodiment, user input seeds are 64 bits, agent IDs are 64 bit, states are 128 bits and supported agent counts are typically in the 1 million-1 billion range. The mixing function is the md5 hash function (as it outputs 128 bits of state), with inputs as combination of root seed+path within the hierarchical tree to generate some agent PRNG state. That end 'seed' is really only representable by a raw 128 bit seed (or of whatever width) with an identity function from that seed→state. Different mixing functions may be used, for example:

SHA-1—, which in one embodiment uses 160 bits for the state value.

SHA-2—, which can embody multiple variants, but in one embodiment, utilizes SHA-512/256 or SHA-512 truncated to 256 bits, in order to obtain more favorable execution speeds on 64 bit architectures SHA-3—which can embody multiple variants, but in one embodiment, using 512 bits of state which may truncated as explained above for SHA-2.

These examples progress in order of relative security. More secure processes for the mixing function may indicate a lower collision rate which as described is desirable for PRNG purposes.

In one embodiment, the SHA-3 is used, but truncated down to the amount of state required for the PRNG. For a PRNG requiring more than 512 bits of state, the hashes can be chained into blocks, similarly to a streaming cipher. In this way, the second 512 bits of state can be obtained by hashing the first 512 bits (and so forth, to the required amount of state). This state extension process can be done as the final stage for state generation to be used in the PRNG, and would not need to be done for intermediate stages in the hierarchy.

Figure 4:
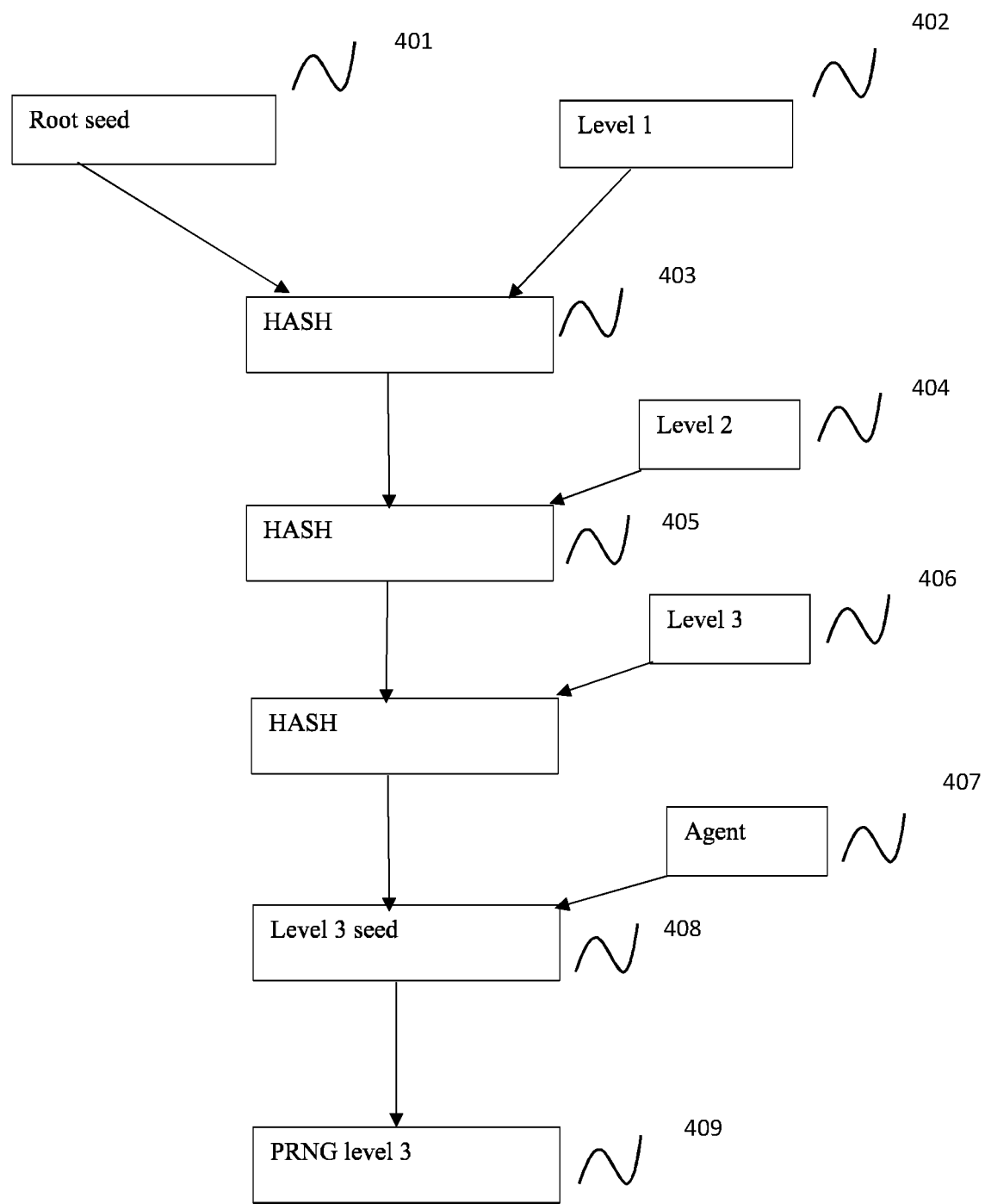
FIG. 4: A diagram depicting multi level distribution with an agent identifier used at the bottom layer.

Operating Environment:

The system is typically comprised of a central server that is connected by a data network to a user's computer. See FIG. 4. The central server may be comprised of one or more computers connected to one or more mass storage devices. The precise architecture of the central server does not limit the claimed invention. Further, the user's computer may be a laptop or desktop type of personal computer. It can also be a cell phone, smart phone or other handheld device, including a tablet. The precise form factor of the user's computer does not limit the claimed invention. Examples of well-known computing systems, environments, and/or configurations that may be suitable for use with the invention include, but are not limited to, personal computers, server computers, hand-held computers, laptop or mobile computer or communications devices such as cell phones, smart phones, and PDA's, multiprocessor systems, microprocessor-based systems, set top boxes, programmable consumer electronics, network PCs, minicomputers, mainframe computers, distributed computing environments that include any of the above systems or devices, and the like. Indeed, the terms "computer," "server," and the like may be used interchangeably herein, and may refer to any of the above devices and systems.

The user environment may be housed in the central server or operatively connected to it. In one embodiment, the user's computer is omitted, and instead an equivalent computing functionality is provided that works on a server. In this case, a user would log into the server from another computer and access the system through a user environment, and thereby access the functionality that would in other embodiments, operate on the user's computer. Further, the user may receive from and transmit data to the central server by means of the Internet, whereby the user accesses an account using an Internet web-browser and the browser displays an interactive web page operatively connected to the central server. The server transmits and receives data in response to data and commands transmitted from the browser in response to the customer's actuation of the browser user interface. Some steps of the invention may be performed on the user's computer and interim results transmitted to a server. These interim results may be processed at the server and final results passed back to the user.

The Internet is a computer network that permits customers operating a personal computer to interact with computer servers located remotely and to view content that is delivered from the servers to the personal computer as data files over the network. In one kind of protocol, the servers present webpages that are rendered on the customer's personal computer using a local program known as a browser. The browser receives one or more data files from the server that are displayed on the customer's personal computer screen. The browser seeks those data files from a specific address, which is represented by an alphanumeric string called a Universal Resource Locator (URL). However, the webpage may contain components that are downloaded from a variety of URL's or IP addresses. A website is a collection of related URL's, typically all sharing the same root address or under the control of some entity. In one embodiment different regions of the simulated space displayed by the browser have different URL's. That is, the webpage encoding the simulated space can be a unitary data structure, but different URL's reference different locations in the data structure. The user computer can operate a program that receives from a remote server a data file that is passed to a program that interprets the data in the data file and commands the display device to present particular text, images, video, audio and other objects. In some embodiments, the remote server delivers a data file that is comprised of computer code that the browser program interprets, for example, scripts. The program can detect the relative location of the cursor when the mouse button is actuated, and interpret a command to be executed based on location on the indicated relative location on the display when the button was pressed. The data file may be an HTML, document, the program a web-browser program and the command a hyper-link that causes the browser to request a new HTML document from another remote data network address location. The HTML can also have references that result in other code modules being called up and executed, for example, Flash or other native code.

The invention may also be entirely executed on one or more servers. A server may be a computer comprised of a central processing unit with a mass storage device and a network connection. In addition a server can include multiple of such computers connected together with a data network or other data transfer connection, or, multiple computers on a network with network accessed storage, in a manner that provides such functionality as a group. Practitioners of ordinary skill will recognize that functions that are accomplished on one server may be partitioned and accomplished on multiple servers that are operatively connected by a computer network by means of appropriate inter process communication. In addition, the access of the web site can be by means of an Internet browser accessing a secure or public page or by means of a client program running on a local computer that is connected over a computer network to the server. A data message and data upload or download can be delivered over the Internet using typical protocols, including TCP/IP, HTTP, TCP, UDP, SMTP, RPC, FTP or other kinds of data communication protocols that permit processes running on two respective remote computers to exchange information by means of digital network communication. As a result a data message can be one or more data packets transmitted from or received by a computer containing a destination network address, a destination process or application identifier, and data values that can be parsed at the destination computer located at the destination network address by the destination application in order that the relevant data values are extracted and used by the destination application. The precise architecture of the central server does not limit the claimed invention. In addition, the data network may operate with several levels, such that the user's computer is connected through a fire wall to one server, which routes communications to another server that executes the disclosed methods.

The invention may also be practiced in distributed computing environments where tasks are performed by remote processing devices that are linked through a communications network. In a distributed computing environment, program modules may be located in both local and remote computer storage media including memory storage devices. Practitioners of ordinary skill will recognize that the invention may be executed on one or more computer processors that are linked using a data network, including, for example, the Internet. In another embodiment, different steps of the process can be executed by one or more computers and storage devices geographically separated by connected by a data network in a manner so that they operate together to execute the process steps. In one embodiment, a user's computer can run an application that causes the user's computer to transmit a stream of one or more data packets across a data network to a second computer, referred to here as a server. The server, in turn, may be connected to one or more mass data storage devices where the database is stored. The server can execute a program that receives the transmitted packet and interpret the transmitted data packets in order to extract database query information. The server can then execute the remaining steps of the invention by means of accessing the mass storage devices to derive the desired result of the query. Alternatively, the server can transmit the query information to another computer that is connected to the mass storage devices, and that computer can execute the invention to derive the desired result. The result can then be transmitted back to the user's computer by means of another stream of one or more data packets appropriately addressed to the user's computer. In one embodiment, a relational database may be housed in one or more operatively connected servers operatively connected to computer memory, for example, disk drives. In yet another embodiment, the initialization of the relational database may be prepared on the set of servers and the interaction with the user's computer occur at a different place in the overall process.

The method described herein can be executed on a computer system, generally comprised of a central processing unit (CPU) that is operatively connected to a memory device, data input and output circuitry (TO) and computer data network communication circuitry. Computer code executed by the CPU can take data received by the data communication circuitry and store it in the memory device. In addition, the CPU can take data from the I/O circuitry and store it in the memory device. Further, the CPU can take data from a memory device and output it through the IO circuitry or the data communication circuitry. The data stored in memory may be further recalled from the memory device, further processed or modified by the CPU in the manner described herein and restored in the same memory device or a different memory device operatively connected to the CPU including by means of the data network circuitry. The CPU may perform logic comparisons of one or more of the data items stored in memory or in the cache memory of the CPU, or perform arithmetic operations on the data in order to make selections or determinations using such logical tests or arithmetic operations. The process flow may be altered as a result of such logical tests or arithmetic operations so as to select or determine the next step of a process. The memory device can be any kind of data storage circuit or magnetic storage or optical device, including a hard disk, optical disk or solid state memory. The IO devices can include a display screen, loudspeakers, microphone and a movable mouse that indicate to the computer the relative location of a cursor position on the display and one or more buttons that can be actuated to indicate a command.

The computer can display on the display screen operatively connected to the I/O circuitry the appearance of a user interface. Various shapes, text and other graphical forms are displayed on the screen as a result of the computer generating data that causes the pixels comprising the display screen to take on various colors and shades or brightness. The user interface may also display a graphical object referred to in the art as a cursor. The object's location on the display indicates to the user a selection of another object on the screen. The cursor may be moved by the user by means of another device connected by I/O circuitry to the computer. This device detects certain physical motions of the user, for example, the position of the hand on a flat surface or the position of a finger on a flat surface. Such devices may be referred to in the art as a mouse or a track pad. In some embodiments, the display screen itself can act as a trackpad by sensing the presence and position of one or more fingers on the surface of the display screen. When the cursor is located over a graphical object that appears to be a button or switch, the user can actuate the button or switch by engaging a physical switch on the mouse or trackpad or computer device or tapping the trackpad or touch sensitive display. When the computer detects that the physical switch has been engaged (or that the tapping of the track pad or touch sensitive screen has occurred), it takes the apparent location of the cursor (or in the case of a touch sensitive screen, the detected position of the finger) on the screen and executes the process associated with that location. As an example, not intended to limit the breadth of the disclosed invention, a graphical object that appears to be a two dimensional box with the word "enter" within it may be displayed on the screen. If the computer detects that the switch has been engaged while the cursor location (or finger location for a touch sensitive screen) was within the boundaries of a graphical object, for example, the displayed box, the computer will execute the process associated with the "enter" command. In this way, graphical objects on the screen create a user interface that permits the user to control the processes operating on the computer.

In some instances, especially where the user computer is a mobile computing device used to access data through the network the network may be any type of cellular, IP-based or converged telecommunications network, including but not limited to Global System for Mobile Communications (GSM), Time Division Multiple Access (TDMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Universal Mobile Telecommunications System (UMTS), Evolution-Data Optimized (EVDO), Long Term Evolution (LTE), Ultra Mobile Broadband (UMB), Voice over Internet Protocol (VoIP), Unlicensed Mobile Access (UMA), any form of 802.11.xx or Bluetooth.

Computer program logic implementing all or part of the functionality previously described herein may be embodied in various forms, including, but in no way limited to, a source code form, a computer executable form, and various intermediate forms (e.g., forms generated by an assembler, compiler, linker, or locator.) Source code may include a series of computer program instructions implemented in any of various programming languages (e.g., an object code, an assembly language, or a high-level language such as C, C++, C#, Action Script, PHP, EcmaScript, JavaScript, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The invention may be described in the general context of computer-executable instructions, such as program modules, being executed by a computer. Generally, program modules include routines, programs, objects, binary components that, when executed by the CPU, perform particular tasks or implement particular abstract data types and when running, may generate in computer memory or store on disk, various data structures. A data structure may be represented in the disclosure as a manner of organizing data, but is implemented by storing data values in computer memory in an organized way. Data structures may be comprised of nodes, each of which may be comprised of one or more computer memory locations into which is stored one or more corresponding data values that are related to an item being represented by the node in the data structure. The collection of nodes may be organized in various ways, including by having one node in the data structure being comprised of a memory location wherein is stored the memory address value or other reference, or pointer, to another node in the same data structure. By means of the pointers, the relationship by and among the nodes in the data structure may be organized in a variety of topologies or forms, including, without limitation, lists, linked lists, trees and more generally, graphs. The relationship between nodes may be denoted in the specification by a line or arrow from a designated item or node to another designated item or node. A data structure may be stored on a mass storage device in the form of data records comprising a database, or as a flat, parsable file. The processes may load the flat file, parse it, and as a result of parsing the file, construct the respective data structure in memory. In other embodiment, the data structure is one or more relational tables stored on the mass storage device and organized as a relational database.

The computer program and data may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed hard disk), an optical memory device (e.g., a CD-ROM or DVD), a PC card (e.g., PCMCIA card, SD Card), or other memory device, for example a USB key. The computer program and data may be fixed in any form in a signal that is transmittable to a computer using any of various communication technologies, including, but in no way limited to, analog technologies, digital technologies, optical technologies, wireless technologies, networking technologies, and internetworking technologies. The computer program and data may be distributed in any form as a removable storage medium with accompanying printed or electronic documentation (e.g., a disk in the form of shrink wrapped software product or a magnetic tape), preloaded with a computer system (e.g., on system ROM or fixed disk), or distributed from a server, website or electronic bulletin board or other communication system (e.g., the Internet or World Wide Web.) It is appreciated that any of the software components of the present invention may, if desired, be implemented in ROM (read-only memory) form. The software components may, generally, be implemented in hardware, if desired, using conventional techniques.

It should be noted that the flow diagrams are used herein to demonstrate various aspects of the invention, and should not be construed to limit the present invention to any particular logic flow or logic implementation. The described logic may be partitioned into different logic blocks (e.g., programs, modules, functions, or subroutines) without changing the overall results or otherwise departing from the true scope of the invention. Oftentimes, logic elements may be added, modified, omitted, performed in a different order, or implemented using different logic constructs (e.g., logic gates, looping primitives, conditional logic, and other logic constructs) without changing the overall results or otherwise departing from the true scope of the invention. Where the disclosure refers to matching or comparisons of numbers, values, or their calculation, these may be implemented by program logic by storing the data values in computer memory and the program logic fetching the stored data values in order to process them in the CPU in accordance with the specified logical process so as to execute the matching, comparison or calculation and storing the result back into computer memory or otherwise branching into another part of the program logic in dependence on such logical process result. The locations of the stored data or values may be organized in the form of a data structure.

The described embodiments of the invention are intended to be exemplary and numerous variations and modifications will be apparent to those skilled in the art. All such variations and modifications are intended to be within the scope of the present invention as defined in the appended claims. Although the present invention has been described and illustrated in detail, it is to be clearly understood that the same is by way of illustration and example only, and is not to be taken by way of limitation. It is appreciated that various features of the invention which are, for clarity, described in the context of separate embodiments may also be provided in combination in a single embodiment. Conversely, various features of the invention which are, for brevity, described in the context of a single embodiment may also be provided separately or in any suitable combination. It is appreciated that the particular embodiment described in the Appendices is intended only to provide an extremely detailed disclosure of the present invention and is not intended to be limiting.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention as defined by the following claims.

What is claimed:

1. A computer system comprised of at least two computers operatively connected over a data network, for operating a computer simulation, said system comprising:
    a first module that operates to receive a root seed value;
    at least two second modules that operate as an at least two agent processes, each said at least two agent processes comprised of a corresponding at least two agent identifier data values that identifies its corresponding agent process;
    at least one third module that operates as a mixing function, using the corresponding agent identifiers and the received root seed value as input to generate a state value; and
    at least one fourth module that uses the generated state values to generate pseudo-random numbers corresponding to the at least one agent.

2. The system of claim 1 further comprising:
    in each computer, at least one fifth module that operates as an at least one corresponding intermediate first node comprised of an identifier value, with a first corresponding level that receives a state value from a second node with a second corresponding level above the intermediate first node, said intermediate first node using a mixing function that takes the intermediate first node identifier value and the received state value to generate a state value corresponding to the intermediate first level.

3. The system of claim 2 further comprising:
    in each computer a pseudo random number generator module that uses the generated intermediate level state value to create a sequence of pseudo-random numbers.

4. The system of claim 1 where the mixing function is a Boolean logic function.

5. The system of claim 1 where the mixing function is an arithmetic function.

6. The system of claim 1 where the mixing function is a hash function.

7. The system of claim 1 where the mixing function in operation exhibits a collision rate below 0.01%.

8. The system of claim 6 where the hash function is cryptographic.

9. The system of claim 6 where the hash function is MD5.

10. The system of claim 6 where the hash function is one of SHA-1, SHA-2 or SHA-3.

11. The system of claim 10 where the hash function is truncated to optimize execution speed on the computer system.

12. The system of claim 11 where the hash function is truncated to one of 256 bits of state or 512 bits of state.

13. The system of claim 11 where the mixing function is chained into blocks.

14. The system of claim 11 where the chaining into blocks occurs at the bottom nodes of the hierarchy.

15. A computer system comprised of at least one computers operatively connected over a data network, for operating a computer simulation comprised of at least a first and a second agent process, said system comprising:
    In each of the at least one computers, a module that receives a root seed value;
    For each agent process, corresponding modules that operate as at least one agent processes, each said agent processes comprised of a corresponding agent identifier data value that identifies its corresponding agent process;
    On each computer, at least one module that operates as a mixing function that uses at least one of the agent identifiers and the received root seed value as input to generate a state value; and
    On each computer, at least one module that uses the generated state value to generate pseudo-random numbers.

16. The system of claim 15 further comprising:
    at least one module that operates as an at least one corresponding intermediate first node at a corresponding level in a hierarchy of nodes, comprised of an identifier value, said intermediate first node further receiving a state value from a second node with a corresponding level in the hierarchy that is above the first node, said intermediate first node using a mixing function that takes the intermediate first node identifier value and the received state value as input in order to generate an intermediate level state value corresponding to the first node.

17. The system of claim 16 further comprising:
    a pseudo random number generator module that uses the generated intermediate level state value to create a sequence of pseudo-random numbers.

18. The system of claim 15 where the mixing function is a Boolean logic function.

19. The system of claim 15 where the mixing function is an arithmetic function.

20. The system of claim 15 where the mixing function in operation exhibits a collision rate below 0.01%.

21. The system of claim 16 where the mixing function is a hash function.

22. The system of claim 21 where the hash function is cryptographic.

23. The system of claim 21 where the hash function is MD5.

24. The system of claim 21 where the hash function is one of SHA-1, SHA-2 or SHA-3.

25. The system of claim 24 where the hash function is truncated to optimize execution speed on the computer system.

26. The system of claim 25 where the hash function is truncated to one of 256 bits of state or 512 bits of state.

27. The system of claim 24 where the mixing function is chained into blocks.

28. The system of claim 27 where the chaining into blocks occurs at the bottom nodes of a hierarchy of nodes.

29. A method executed by a computer system comprised of at least one computers operatively connected over a data network, for operating a computer simulation comprised of at least a first and a second agent process, said method comprising:
receiving a root seed value;
executing at least one agent processes, each of said at least one agent processes comprised of a corresponding agent identifier data value that identifies its corresponding agent process;
operating a mixing function that uses the at least one agent identifier data values and the received root seed value as input to generate a corresponding at least one state values that correspond to each of the at least one agent processes; and
generating pseudo-random numbers for the at least one agent processes using the state values.

30. The method of claim 29 further comprising:
operating an at least one process as an intermediate first node at a corresponding level in a hierarchy of nodes, said intermediate first node comprised of an identifier value, said intermediate first node receiving a state value from a second node with a corresponding level in the hierarchy above the first node; operating a mixing function process that takes the intermediate first node identifier value and the received state value as input in order to generate an intermediate level state value.

31. The method of claim 30 further comprising:
operating a pseudo random number generator process that uses the generated intermediate level state value to create a sequence of pseudo-random numbers.

32. The method of claim 29 where the mixing function is a Boolean logic function.

33. The method of claim 29 where the mixing function is an arithmetic function.

34. The method of claim 29 where the mixing function in operation exhibits a collision rate below 0.01%.

35. The method of claim 29 where the mixing function is a hash function.

36. The method of claim 35 where the hash function is cryptographic.

37. The method of claim 35 where the hash function is MD5.

38. The method of claim 35 where the hash function is one of SHA-1, SHA-2 or SHA-3.

39. The method of claim 38 where the hash function is truncated to optimize execution speed on the computer system.

40. The method of claim 39 where the hash function is truncated to one of 256 bits of state or 512 bits of state.

41. The method of claim 39 where the mixing function is chained into blocks.

42. The method of claim 41 where the chaining into blocks occurs at the bottom nodes of a hierarchy of nodes.

* * * * *